G. W. DOBSON.
BALL BEARING.
APPLICATION FILED NOV. 27, 1914.

1,158,901. Patented Nov. 2, 1915.

Witnesses:
Arthur W. Carlson
Robert H. Weir

Inventor
George W. Dobson,
by Jno. G. Elliott
Atty.

UNITED STATES PATENT OFFICE.

GEORGE W. DOBSON, OF CHICAGO, ILLINOIS.

BALL-BEARING.

1,158,901.  Specification of Letters Patent.  Patented Nov. 2, 1915.

Application filed November 27, 1914. Serial No. 874,124.

*To all whom it may concern:*

Be it known that I, GEORGE W. DOBSON, a citizen of the United States, and resident of Chicago, in the county of Cook and State of Illinois, have invented certain new and useful Improvements in Ball-Bearings, of which the following is a full, clear, and exact specification.

This invention relates to improvements in ball bearings for shafts and particularly for the rollers of gravity conveyers, wherein the conveying surface consists of a series of rollers interposed between supporting members provided at each end with a metal ring permanently locked to the rollers.

The prime object of this invention is a ball bearing in which a series of balls are confined in an endless runway by means of a support comprising a plurality of members detachably connected and locked in their operative position against detachment by a very simple and inexpensive means, and which may be conveniently assembled, and quickly disconnected therefrom for access to the balls.

More specifically stated the object of my invention is to successfully utilize a split sleeve for confining a series of balls in a runway formed by opposing members, one of which is detachable from the other, and in such a manner that the balls are confined in their locked position against accidental detachment, and the split sleeve may be conveniently removed for purposes of access to the balls, and their opposing bearings.

With these ends in view, my invention finds embodiment in certain features of novelty in the construction, combination and arrangement of parts by which the said objects and certain other objects are attained, all as hereinafter fully described with reference to the accompanying drawings, and more particularly pointed out in the claims.

Figure 1:
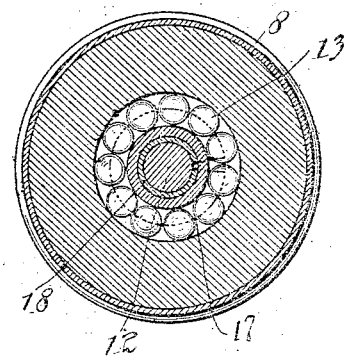
Figure 2:
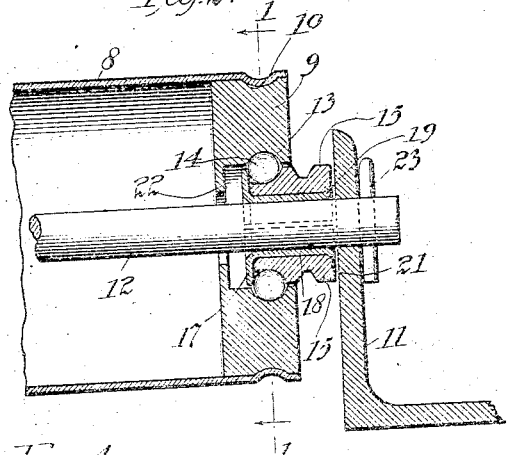
Figure 3:
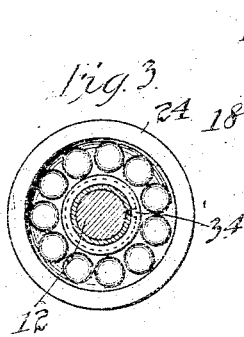
Figures 4, 5:
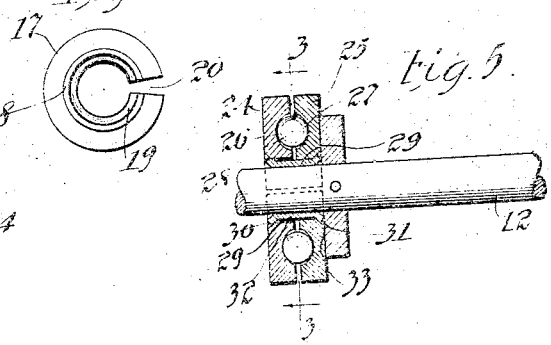
Figure 6:
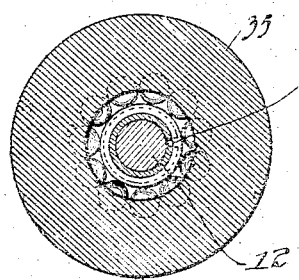
Figure 7:
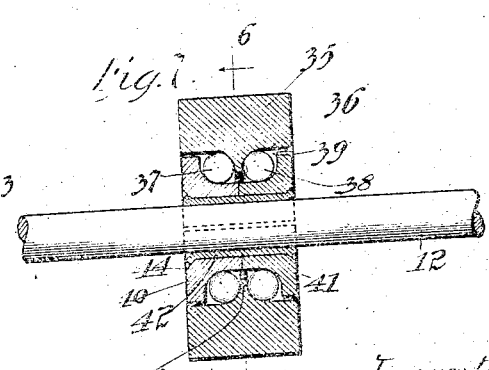

In said drawings: Figure 1 is a transverse section on the line 1—1 of Fig. 2 through a ball bearing, in which my invention finds embodiment, and showing its adaptability to one of the rollers of a gravity conveyer. Fig. 2 is a longitudinal section of the same showing one of the end supports of the shaft on which the roller and ball bearing are sleeved. Fig. 3 is a transverse section of a modified form of my invention taken on the line 3—3 of Fig. 5. Fig. 4 is an end elevation of the split sleeve shown in Fig. 2 detached from the bearing. Fig. 5 is a vertical section of the modification illustrated in Fig. 3. Fig. 6 is a transverse section of a modification of my invention taken on the line 6—6 of Fig. 7, and Fig. 7 is a vertical section of the same.

Similar characters of reference indicate the same parts in the several figures of the drawing.

8 indicates a sheet metal roller for a gravity conveyer, the opposite ends of which are closed by a ring 9, provided with a circumferential groove 10, into which the sheet metal of the roller is pressed for locking these two parts together.

At each end of the rollers are brackets 11, providing a bearing for a shaft 12 on which the roller 8 is sleeved.

The ring 9 is provided with semi-circular annular grooves 13 for the reception of a series of balls 14, in turn bearing against one of the supporting members 15 of the ball bearing structure, and to which end said member 15 is reduced as indicated at 16, the balls being confined in the runway thus formed between the member 15 and the annular groove 13 in the ring 9, and the member 15 against outward movement by means of a flange 17 integral with or otherwise secured to a sleeve 18, the opposite and outer end of which sleeve is flared by bending the metal outwardly as indicated at 19.

The material of the sleeve 18 is resilient, and is split from end to end, that is to say provided with a normally open slot from end to end as indicated at 20 in Fig. 4, and whereby it is adapted when compressed to be pushed through the tubular supporting member 15, and thereafter expand not only to closely fit the passage through the latter, but to force the flaring end of the split sleeve outwardly over against an incline shoulder 21 of the tubular supporting member, and whereby the sleeve is locked thereto in its operative position, and the balls are maintained therein by the flange 17.

The ball bearing shown in Fig. 2 is assembled in the ring, and for which purpose the sleeve is first inserted to a position of support against an annular flange 22 in the ring, following which the necessary number of balls are dropped upon the flange of the sleeve followed by inserting the tubular ball bearing member over the sleeve and between the balls, and thereupon inserting a hook through and pulling the sleeve outwardly from its seat against the flange 22 to a position permitting its flaring, and to expand to a seated position against the inclined end 21 of the member 15.

Although a ball bearing of my invention is particularly adapted for its application to rollers for a gravity conveyer, it is also adapted in a modified form for shaft bearings, and as will now be described.

In Figs. 3 and 5 is shown an end thrust bearing in which 24 and 25 are opposing ball supporting rings, provided respectively with opposing circular grooves 26 and 27, approximately semi-circular in cross section, forming a substantially closed runway for and confining a series of balls 28.

Passing through both of the rings 24 and 25 is a sleeve 29, both ends of which are flared by bending them outwardly as indicated at 30 and 31 respectively, which flaring ends are opposed by correspondingly inclined seats 32, 33 respectively formed in the rings adjacent their outer faces. The sleeve 29, like the sleeve 18 in Fig. 2 is split from end to end, that is to say is provided with an open slot 34, at one side from end to end, and consists of a resilient metal. Normally, like the sleeve 18, this split sleeve 29 is somewhat larger than the bore of the rings 24 and 25, and as a result must be compressed for its passage through said rings, so that when permitted to expand its flared ends will move to engagement with the inclined shoulders of the rings, and thereby lock the opposing rings together, and confine the balls in their runway against accidental detachment, and yet permit the rings 24 to freely rotate on the sleeve.

My invention also finds its embodiment in still another form of construction, for example, in radial or thrust bearings, shown in Figs. 6 and 7, in which there is employed but a single ring 35, provided with an inwardly projecting flange 36, separating a series of balls 37 and 38 confined in a circumferential groove 39 in a transversely divided hub consisting of detachable members 40 and 41.

The greatest diameter of this hub is somewhat less than that of the opening through the ring, and as a result of which it is supported from contact with the ring by means of the balls as indicated in Fig. 7.

Passing through the hub is a split sleeve 42 split from end to end as indicated at 43, and which in every respect is similar to the ring 29 of Fig. 5, including the flaring ends and the opposition thereto of inclined surfaces 44 on the hub at opposite ends thereof.

From the foregoing it will now be understood that my invention is adapted as a ball bearing for a roller sleeved on a shaft, journaled at its ends in fixed bearings, or as a direct bearing for a shaft as indicated in Figs. 5 and 7, and furthermore that my invention finds its embodiment in several structures differing one from the other mechanically speaking.

Having described my invention, what I claim and desire to secure by Letters Patent is:

1. A ball bearing for rollers and shafts comprising in combination a plurality of ball supporting members, providing a continuous runway for a series of balls confined therein, an expansive split sleeve passing through and removably locking said members against accidental detachment.

2. A ball bearing for rollers, and shafts, comprising in combination opposing members provided with a circular groove, supporting and confining a series of anti-friction balls in their runway, a series of anti-friction balls therefor, and a resilient split tube forming a sleeve for said opposing members, one end of which tube is flared and thereby adapted to removably lock said members together.

3. A ball bearing for the purpose described comprising a hub, provided with a circumferential groove forming a support for and confining the balls in their runway, and a resilient split tube for maintaining the balls against accidental detachment from their runway.

In witness whereof, I have hereunto set my hand and affixed my seal, this 23rd day of November, A. D. 1914.

GEORGE W. DOBSON. [L. S.]

Witnesses:
   JNO. G. ELLIOTT,
   MILDRED ELSNER.